United States Patent
Robinson et al.

(10) Patent No.: US 9,038,837 B2
(45) Date of Patent: May 26, 2015

(54) REMOVABLE ENDWALL PLATE FOR ELECTRICAL PANELS OR ENCLOSURES

(75) Inventors: Kristopher Scott Robinson, Atlanta, GA (US); Jeffrey K. Hudgins, Jr., Gainesville, GA (US); Arthur Shumate, Duluth, GA (US); Brian J. Rusch, Suwanee, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 550 days.

(21) Appl. No.: 12/731,607

(22) Filed: Mar. 25, 2010

(65) Prior Publication Data

US 2010/0258559 A1 Oct. 14, 2010

Related U.S. Application Data

(60) Provisional application No. 61/167,594, filed on Apr. 8, 2009.

(51) Int. Cl.
| | |
|---|---|
| *H02G 3/08* | (2006.01) |
| *B65D 90/02* | (2006.01) |
| *B65D 88/10* | (2006.01) |
| *B65D 90/26* | (2006.01) |

(52) U.S. Cl.
CPC .............. *H02G 3/081* (2013.01); *B65D 90/026* (2013.01); *B65D 90/023* (2013.01); *B65D 88/10* (2013.01); *B65D 90/26* (2013.01); *H02G 3/085* (2013.01)

(58) Field of Classification Search
CPC .. B65D 11/1866; B65D 11/1873; B65D 7/24; B65D 7/12; B65D 90/026; B65D 90/023; B65D 88/127; B65D 88/121; B65D 88/10
USPC .......................................... 220/3.7, 4.28, 1.5
See application file for complete search history.

(56) References Cited

U.S. PATENT DOCUMENTS

| | | | | |
|---|---|---|---|---|
| 2,717,715 | A * | 9/1955 | Whelan | 220/3.94 |
| 3,315,639 | A * | 4/1967 | Close | 118/642 |
| 3,598,273 | A * | 8/1971 | Rau et al. | 220/1.5 |
| 4,263,472 | A * | 4/1981 | Maheu | 174/51 |
| 5,720,403 | A * | 2/1998 | Sawyer | 217/65 |
| 6,513,670 | B2 * | 2/2003 | Minkkinen | 220/1.5 |

* cited by examiner

*Primary Examiner* — Stephen Castellano

(57) ABSTRACT

The present invention relates generally to electrical panels or enclosures. More particularly, the invention encompasses a removable endwall plate for electrical panels or enclosures. The present invention is also directed to a novel electrical panel or enclosure where an endwall is removably attached to a frame. The endwall can be removed and can be cut at desired locations to create holes or openings for electrical components. The removable endwall can also have one or more knockouts which can be removed from the endwall as needed. One could also have at least one knockout within the knockout.

20 Claims, 2 Drawing Sheets

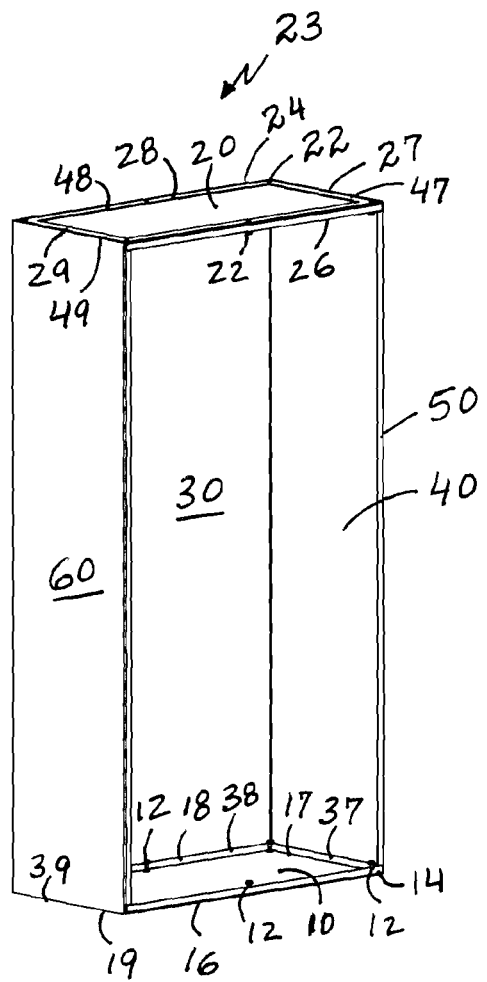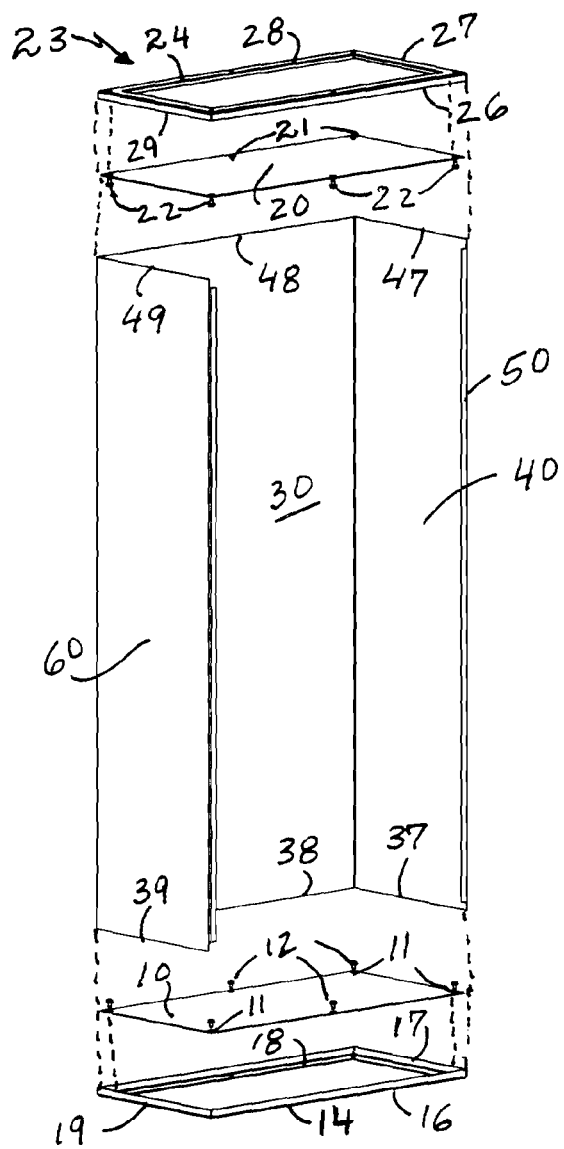
FIG. 1
FIG. 2

REMOVABLE ENDWALL PLATE FOR ELECTRICAL PANELS OR ENCLOSURES

CROSS-REFERENCE TO RELATED APPLICATION

The instant patent application claims priority to and the benefit of pending U.S. Provisional Patent Application Ser. No. 61/167,594, filed on Apr. 8, 2009, titled "Removable Endwall Plate For Electrical Panels or Enclosures," the entire disclosure of which provisional application is incorporated herein by reference.

FIELD OF THE INVENTION

The present invention relates generally to electrical panels or enclosures. More particularly, the invention encompasses a removable endwall plate for electrical panels or enclosures. The present invention is also directed to a novel electrical panel or enclosure where an endwall is removably attached to a frame. The endwall can be removed and can be cut at desired locations to create holes or openings for electrical components. The removable endwall can also have one or more knockouts which can be removed from the endwall as needed. One could also have at least one knockout within the knockout.

BACKGROUND INFORMATION

Contractors/electricians/installers spend hours aligning conduit to pre-cut knockouts in an enclosure wall. They also spend excessive time measuring and transposing conduit profiles on a fixed blank endwall which is permanently attached to a panel or enclosure before cutting the required openings for a wire conduit or any other required opening or conduit. Most of the time these openings have to be made prior to hanging or mounting the panel or enclosure onto the wall. For this reason, panels or enclosures having a fixed endwall creates an awkward process of cutting the holes needed for the conduit, such as, a wire conduit. It also produces an awkward process for hanging or mounting of the enclosure to the wall once the openings have been cut. In this manner the installation of a panel or enclosure becomes very labor intensive and time consuming. Therefore, there is a need for improvement in electrical panels or enclosures, especially for accommodating electrical components, such as, electrical wires, electrical conduits, to name a few.

U.S. Pat. No. 4,679,867 (Stanley W. Heldenbrand, et al.), the entire disclosure of which is incorporated herein by reference, discloses a cabinet for an electronic apparatus which includes a shelf of removable electronic circuit modules being interconnected by a back plane structure, the cabinet including side walls for supporting the shelf and a rear closure wall detachably fixed to rear edges of the side walls. Connector panels each diagonally straddle rear interior corners at junctions of the rear wall and the side walls to define vertical cable channels. An interconnect cavity behind the back plane structure is defined by a central portion of the rear wall between the connector panels and is limited by upper and lower closure panels at upper and lower ends of the connector panels. Edges of the upper and lower closure panels and the connector panels define a port for convenient physical access to the interconnect cavity when the rear wall is removed. Cable spans between the back plane structure and the connector panels are inherently direct and short, thereby minimizing potential EMI radiation such that feedthrough capacitance of connectors in the connector panel is likewise advantageously minimized.

U.S. Pat. No. 6,751,913 (John R. Marrotte, et al.), the entire disclosure of which is incorporated herein by reference, discloses a wall structure includes at least two studs that are designed to support panels front and back, and end caps or raceway channel defining members on the leading and trailing edges of the panel wall structure. Each of the studs includes sets of oppositely arranged flanges that in turn cooperate with marginal edges of both the panels and the raceway defining members. Cross bracing is provided to allow wiring either within the enclosed space between the panels, or more preferably in the wireways defined in the raceway members so that the power and data communication conductors can be isolated from one another. The feature of the panel structure is that the panels themselves can support light fixtures or other lightweight electrical devices, and heavier electrical devices or units can be accommodated from the cross bracing or from shelves secured to the cross bracing and to the studs. Knockout openings in the studs and in the cross bracing provides for convenience in wiring and in mounting of electrical devices generally.

U.S. Pat. No. 7,286,339 (William C. Baca), the entire disclosure of which is incorporated herein by reference, discloses an underground combination service entrance apparatus for temporary and permanent service comprising two enclosures. A utility enclosure contains a meter socket and the second enclosure contains a breaker panel. The breaker panel on the customer side and the meter on the utility side meet NEC requirements and the local utility company regulations. An optional section in the utility enclosure provides a raceway space for routing wiring. Knockout holes are provided on the utility enclosure for installation of a hub for running wires to and from the service apparatus. The enclosures can be semi-flushed mounted. The two enclosures are isolated from each other, fastened together, and mounted on a wall. A removable hood is provided to weatherproof the customer enclosure for temporary use.

However, this invention improves on the deficiencies of the prior art and provides an inventive removable endwall plate for electrical panels or enclosures.

PURPOSES AND SUMMARY OF THE INVENTION

The invention is a novel removable endwall plate for electrical panels or enclosures.

Therefore, one purpose of this invention is to provide a removable endwall plate for electrical panels or enclosures.

Another purpose of this invention is to provide at least one endwall for an electrical panel or enclosure, which can be removed in the field, and where at least one opening can be created in the endwall, and the endwall with at least one opening is then secured back onto the frame of the electrical panel or enclosure.

Yet another purpose of this invention is to provide an endwall having at least one knockout, and where the knockout can be removed when desired.

Therefore, in one aspect this invention comprises an electrical apparatus comprising:
(a) an enclosure, said enclosure having at least one back wall, a first side wall, a second side wall;
(b) a bottom frame, wherein said bottom frame is secured to a bottom edge of said enclosure;
(c) a top frame, wherein said top frame is secured to a top edge of said enclosure; and (d) at least one removable endwall secured to said enclosure.

In another aspect this invention comprises an electrical apparatus comprising:
(a) an enclosure, said enclosure having at least one back wall, a first side wall, a second side wall;
(b) a bottom frame, wherein said bottom frame is secured to a bottom edge of said enclosure;
(c) a top frame, wherein said top frame is secured to a top edge of said enclosure;
(d) at least one removable endwall secured to said enclosure.
(e) at least one means for removing said at least one removable endwall from said enclosure;
(f) at least one means for creating at least one opening in said at least one removable endwall; and
(g) at least one means for securing said at least one removable endwall with said at least one opening back into its previous location in said enclosure.

BRIEF DESCRIPTION OF THE DRAWINGS

Although the scope of the present invention is much broader than any particular embodiment, a detailed description of the preferred embodiment follows together with drawings. These drawings are for illustration purposes only and are not drawn to scale. Like numbers represent like features and components in the drawings. The invention may best be understood by reference to the ensuing detailed description in conjunction with the drawings in which:

FIG. 1, illustrates a perspective view of a first embodiment of an inventive electrical panel or enclosure of this invention.

FIG. 2, illustrates an exploded view of the inventive electrical panel or enclosure of the invention illustrated in FIG. 1.

DETAILED DESCRIPTION

Figure 3:
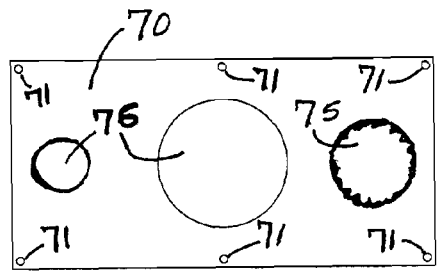
FIG. 3, illustrates a top view of a second embodiment of an inventive removable endwall of this invention.

The removable endwall plate of this invention alleviates the need for measuring and transposing conduit profiles on a fixed blank endwall. This invention also eliminates the time spent awkwardly aligning conduit to an endwall with pre-cut knockouts. Furthermore, this invention also allows contractors/electricians/installers to remove the endwall, as needed, and directly transpose conduit profiles after the panel has been hung or mounted onto the wall or similar surface. Cutting the required hole or openings for a conduit, such as, a wire conduit, using this invention is an easier and much more efficient method.

The removable endwall plate invention provides a convenient method of passing incoming or outgoing wire conduits through the top and/or bottom of an electrical panel or enclosure. This also allows installing the electrical panel or enclosure before cutting openings, and handling a small endwall plate or panel instead of the entire electrical panel or enclosure when adding or creating openings.

This invention, as stated earlier, comprises of at least one removable endwall plate that can be removed before or after installing an electrical panel or enclosure onto the wall. Removing the endwall plate provides a convenient method for the contractor/electrician/installer to create openings of any size and location required for conduits used while wiring the electrical panel or enclosure. The removable endwall plate can either be blank or consist of knockouts (pre-defined weakened area in a panel used in the industry to create openings as needed) that the contractor/electrician/installer can remove to create the desired opening(s). This invention will reduce hours of wiring time from an electrical panel or enclosure installation.

FIG. 1, illustrates a perspective view of a first embodiment of an inventive electrical panel or enclosure 23, of this invention. The electrical panel or enclosure 23, comprises of a base or bottom frame 14, a top or upper frame 24, a wrapper 50, a top removable endwall 20, and a bottom removable endwall 10. The base frame 14, comprises of a bottom front frame 16, a bottom first side frame 17, a bottom rear frame 18, and a bottom second side frame 19. The wrapper 50, typically comprises of a first side panel 40, having a bottom side edge 37, and a top side edge 47, a rear or back panel 30, comprising a bottom rear edge 38, and a top rear edge 48, and a second side panel 60, having a bottom side edge 39, and a top side edge 49. For some applications the wrapper 50, may have a front panel or front door (not shown). The top or upper frame 24, comprises of a top front frame 26, a top first side frame 27, a top rear or back frame 28, and a top second side frame 29. For most applications it is preferred that the bottom frame 14, is permanently secured to the wrapper 50, such that the bottom side edge 37, is secured to the bottom side frame 17, the bottom back edge 38, is secured to bottom back frame 18, and that the bottom side edge 39, is secured to the bottom side frame 19. Similarly, for most applications it is preferred that the top frame 24, is permanently secured to the wrapper 50, such that the top side edge 47, is secured to the top side frame 27, the top back edge 48, is secured to top back frame 28, and that the top side edge 49, is secured to the top side frame 29. The removable bottom endwall 10, is preferably secured to the bottom frame 14, using at least one securing means 12. The removable top endwall 20, is preferably secured to the top frame 24, using at least one securing means 22. In a typical installation one would pass incoming or outgoing wire conduits through either the top endwall 20, and/or bottom endwall 10, of the inventive electrical panel or enclosure 23. For the ease of understanding the other electrical and mechanical components of the inventive electrical panel or enclosure 23, are not shown.

FIG. 2, illustrates an exploded view of the inventive electrical panel or enclosure 23, of the invention illustrated in FIG. 1. FIG. 2, clearly shows the removable top endwall plate 20, and the removable bottom endwall plate 10, of the enclosure or wrapper 50. The removable bottom endwall plate 10, and the removable top endwall plate 20, are preferably blank plates 10, 20, when they are initially assembled. However, the plates 10, 20, can have one or more specific sized knockout or knockout clusters (shown in FIGS. 3 and 4). The removable endwall plate 10, 20, can be removed or assembled to the base frame 14, top frame 24, with the use of hardware or securing means 12, 22, respectively. The hardware or securing means 12, 22, can be selected from a group comprising, screws, nuts, bolts, welds, to name a few. For the ease of understanding the bottom frame 14, and the top frame 24, is shown separated from the wrapper 50, however, for most applications the bottom frame 14, and the top frame 24, are permanently secured to the wrapper 50. The removable bottom endwall 10, has at least one opening or location 11, to secure the removable bottom endwall 10, to the bottom frame 14, via at least one securing means 12. Similarly, the removable top endwall 20, has at least one opening or location 21, to secure the removable top endwall 20, to the top frame 24, via at least one securing means 22. Thus, for most applications the removable bottom endwall 10, and the removable top endwall 20, are removable panels or plates from the inventive electrical panel or enclosure 23. It should be appreciated that the endwall 10, could be secured to the bottom or top surface of the frame 14. Similarly, the endwall 20, could be secured to the bottom or top surface of the frame 24. As illustrated in FIG. 2, the endwall 10, is secured to the top surface of the frame 14, while the endwall 20, is secured to the bottom surface of the frame 14.

FIG. 3, illustrates a top view of a second embodiment of an inventive removable endwall 70, of this invention. The removable endwall 70, is similar to the bottom endwall 10, or the top endwall 20, however, the removable endwall 70, has either at least one knockout 76, or at least one hole or opening 75. The removable endwall 70, could have at least one opening or location 71, for securing the removable endwall 70, to either the bottom frame 14, or the top frame 24, of the inventive electrical panel or enclosure 23.

Figure 4:
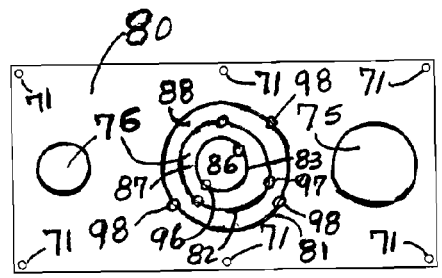
FIG. 4, illustrates a top view of a third embodiment of an inventive removable endwall of this invention.

FIG. 4, illustrates a top view of a third embodiment of an inventive removable endwall 80, of this invention. The removable endwall 80, is similar to the removable endwall 10, 20, 70, however, the removable endwall 80, has either at least one removable knockout 76, or at least one hole or opening 75. The removable knockout 76, could further comprise of one or more knockouts, such as, knockout 86, 87, 88, having a weakened outline 81, 82, 83, respectively. The knockouts 86, 87, 88, could also have one or more perforations or tabs 96, 97, 98, respectively, along the weakened outline 81, 82, 83, respectively. This concept of a knockout within a knockout allows an operator or installer to select the opening that is desired and remove each knockout 76, 86, 87, 88, as desired or needed for the application. Additionally, having one or more perforations or tabs 96, 97, 98, along the knockout outline or weakened area 81, 82, 83, allows an installer to easily pop-out a knockout 76, 86, 87, 88, from the removable endwall 10, 20, 70, 80, without the use of specialized tools.

Figure 5:
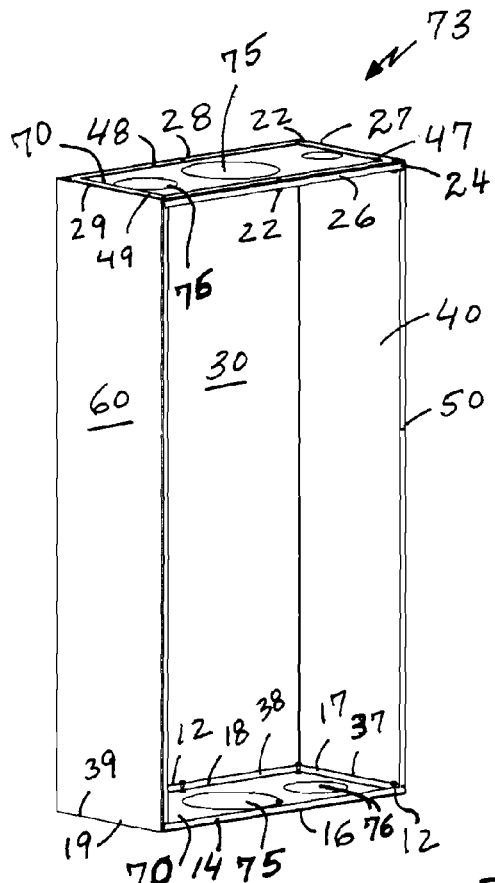
FIG. 5, illustrates a perspective view of a fourth embodiment of an inventive electrical panel or enclosure of this invention.

FIG. 5, illustrates a perspective view of a fourth embodiment of an inventive electrical panel or enclosure 73, of this invention. The electrical panel or enclosure 73, has a first removable endwall 70, secured to a bottom frame 14, and a second removable endwall 70, secured to a top frame 24. The removable endwall 70, could have at least one knockout 76, or at least one hole or opening 75. However, the removable endwall 70, could be similar to removable endwall 10, 20. As shown in FIGS. 1 and 2, the removable endwall 10, 20, do not have an opening, however, when desired, an operator could remove the removable endwall 10 and/or 20, and create one or more opening 75. As one can appreciate that it is rather easy for an operator to remove endwall 10, 20, 70, and then work on the endwall 10, 20, 70, as desired, and then easily secure the endwall 10, 20, 70, back in the frame 14, 24. With this invention an operator does not have to manipulate the whole electrical panel or enclosure 23, 73, but only the endwall 10, 20, 70. The opening 75, can be created by methods well known in the art, such as, for example, using a saw, a snip, a cutter, a laser beam, or any other device or tool that can cut a hole or opening in a panel or plate or endwall 10, 20, 70.

The shape of the hole or opening 75, could be selected from a group comprising, a square shape, a circular shape, an elliptical shape, a triangular shape, a polygonal shape, a jagged shape, to name a few.

The shape of the knockout 76, could be selected from a group comprising, a square shape, a circular shape, an elliptical shape, a triangular shape, a polygonal shape, a jagged shape, to name a few.

The material for the endwall 10, 20, 70, could be selected from a group comprising, a metallic material, a plastic material, a fiberglass material, a rubber material, a composite material, to name a few.

The material for the wrapper 50, could be selected from a group comprising, a metallic material, a plastic material, a fiberglass material, a rubber material, a composite material, to name a few.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. An enclosure for an electrical apparatus comprising:
   (a) a wrapper, said wrapper having a back wall, a first side wall, a second side wall, and wherein a first edge of said back wall is secured to an edge of said first side wall, and a second edge of said back wall is secured to an edge of said second side wall to form said wrapper;
   (b) a bottom frame, wherein said bottom frame is secured to a bottom edge of said wrapper;
   (c) a top frame, wherein said top frame is secured to a top edge of said wrapper; and
   (d) at least one removable first endwall panel secured to said wrapper via at least one of said top frame and said bottom frame, wherein said at least one removable first endwall panel includes at least one first opening arranged in a first opening configuration and wherein said at least one removable first endwall panel is capable of being separable from said wrapper and said at least one top frame and said bottom frame, and wherein said at least one removable first endwall panel has a first surface and a second surface, and wherein said first surface of said at least one removable first endwall panel is in direct contact with the edges of said wrapper, while said second surface of said at least one removable first endwall panel is in direct contact with said at least one frame when said at least one removable first endwall panel is secured to said wrapper via said at least one frame to form said enclosure for an electrical apparatus and wherein said at least one removable first endwall panel is interchangeable with at least one removable second endwall panel having at least one second opening arranged in a second opening configuration different from said first opening configuration.

2. The enclosure of claim 1, wherein said at least one removable first endwall panel is secured to said bottom frame such that said at least one removable first endwall panel is between said bottom frame and said wrapper.

3. The enclosure of claim 1, wherein said at least one removable first endwall panel is secured to said top frame such that said at least one removable first endwall panel is between said top frame and said wrapper.

4. The enclosure of claim 1, wherein material for said enclosure is selected from a group consisting of a metallic material, a plastic material, a fiberglass material, a rubber material, and a composite material.

5. The enclosure of claim 1, wherein material for said at least one removable first endwall panel is selected from a group consisting of a metallic material, a plastic material, a fiberglass material, a rubber material, and a composite material.

6. The enclosure of claim 1, wherein at least one securing means secures said wrapper to said at least one frame.

7. The enclosure of claim 1, wherein at least one first opening is made in said at least one removable first endwall panel using at least one tool selected from a group consisting of a saw, a snip, a cutter, a laser beam, and a device for creating a hole in a panel.

8. The enclosure of claim 1, wherein said at least one removable first endwall panel has at least one preformed knockout.

9. The enclosure of claim 1, wherein said at least one removable first endwall panel has at least one preformed knockout, and wherein the shape of said at least one knockout is selected from a group consisting of a circular shape.

10. The enclosure of claim 1, wherein said at least one removable first endwall panel is secured to said wrapper using at least one securing means, and wherein said at least one securing means is selected from a group consisting of a screw, a nut, a bolt, and a weld.

11. An enclosure for an electrical apparatus comprising:
   (a) a wrapper having a back wall, a first side wall, a second side wall, and wherein a first edge of said back wall is secured to an edge of said first side wall, and a second edge of said back wall is secured to an edge of said second side wall to form said wrapper;
   (b) a bottom frame, wherein said bottom frame is secured to a bottom edge of said wrapper;
   (c) a top frame, wherein said top frame is secured to a top edge of said enclosure;
   (d) at least one removable first endwall panel secured to said enclosure via at least one of said top frame and said bottom frame;
   (e) said at least one removable first endwall panel being removable from said enclosure;
   (f) removing said at least one removable first endwall panel from said at least one frame and forming at least one first opening arranged in a first opening configuration in said at least one removable first endwall panel; and
   (g) securing said at least one removable first endwall panel after forming said at least one opening back into its previous location and securing said at least one removable first endwall panel having said at least one opening using one of said frames to said wrapper, and wherein said at least one removable first endwall panel is capable of being separable from said wrapper and said at least one top frame and said bottom frame, and wherein said at least one removable first endwall panel has a first surface and a second surface, and wherein said first surface of said at least one removable first endwall panel is in direct contact with the edges of said wrapper, while said second surface of said at least one removable first endwall panel is in direct contact with said at least one frame when said at least one removable first endwall panel is secured to said wrapper via said at least one frame to form said enclosure for an electrical apparatus and wherein said at least one removable first endwall panel is interchangeable with at least one removable second endwall panel having at least one second opening arranged in a second opening configuration different from said first opening configuration.

12. The enclosure of claim 11, wherein said at least one removable first endwall panel is secured to said bottom frame, such that said at least one removable first endwall panel is between said bottom frame and said wrapper.

13. The enclosure of claim 11, wherein said at least one removable first endwall panel is secured to said top frame, such that said at least one removable first endwall panel is between said top frame and said wrapper.

14. The enclosure of claim 11, wherein material for said enclosure is selected from a group consisting of a metallic material, a plastic material, a fiberglass material, a rubber material, and a composite material.

15. The enclosure of claim 11, wherein material for said at least one removable first endwall panel is selected from a group consisting of a metallic material, a plastic material, a fiberglass material, a rubber material, and a composite material.

16. The enclosure of claim 11, wherein at least one securing means secures said wrapper to said at least one frame.

17. The enclosure of claim 11, wherein at least one first opening is made in said at least one removable first endwall panel using at least one tool selected from a group consisting of a saw, a snip, a cutter, a laser beam, and a device for creating a hole in a panel.

18. The enclosure of claim 11, wherein said at least one removable first endwall panel has at least one preformed knockout.

19. The enclosure of claim 11, wherein said at least one removable first endwall panel has at least one preformed knockout, and wherein the shape of said at least one knockout is selected from a group consisting of a circular shape.

20. The enclosure of claim 11, wherein said at least one removable first endwall panel is secured to said wrapper using at least one securing means, and wherein said at least one securing means is selected from a group consisting of a screw, a nut, a bolt, and a weld.

* * * * *